(12) United States Patent
Goswami

(10) Patent No.: US 11,066,033 B2
(45) Date of Patent: Jul. 20, 2021

(54) SEAT-MOUNTED OCCUPANT RESTRAINT SYSTEM

(71) Applicant: ZF Passive Safety Systems US Inc., Washington, MI (US)

(72) Inventor: Swagat Goswami, Rochester, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 56 days.

(21) Appl. No.: 16/693,489

(22) Filed: Nov. 25, 2019

(65) Prior Publication Data

US 2021/0155194 A1 May 27, 2021

(51) Int. Cl.
*B60R 21/207* (2006.01)
*B60R 21/2338* (2011.01)
*B60R 21/232* (2011.01)
*B60R 21/214* (2011.01)
*B60R 21/013* (2006.01)
*B60R 22/18* (2006.01)
*B60R 22/46* (2006.01)
*B60R 21/00* (2006.01)
*B60R 21/231* (2011.01)

(52) U.S. Cl.
CPC .......... *B60R 21/207* (2013.01); *B60R 21/013* (2013.01); *B60R 21/214* (2013.01); *B60R 21/232* (2013.01); *B60R 21/2338* (2013.01); *B60R 22/18* (2013.01); *B60R 22/4619* (2013.01); *B60R 2021/0051* (2013.01); *B60R 2021/0053* (2013.01); *B60R 2021/23107* (2013.01); *B60R 2021/23382* (2013.01); *B60R 2021/23386* (2013.01)

(58) Field of Classification Search
CPC . B60R 21/207; B60R 21/2338; B60R 21/232; B60R 22/18; B60R 21/013; B60R 21/214; B60R 22/4619; B60R 2021/23386; B60R 2021/23382; B60R 2021/0053; B60R 2021/0051; B60R 2021/23107
See application file for complete search history.

(56) References Cited

U.S. PATENT DOCUMENTS

| | | | | |
|---|---|---|---|---|
| 5,542,696 A | * | 8/1996 | Steffens, Jr. | .......... B60R 21/207 280/730.1 |
| 6,142,521 A | * | 11/2000 | Shephard | ................ B60R 19/00 280/728.1 |
| 10,023,145 B1 | * | 7/2018 | Rivera | ................ B60R 21/0136 |

(Continued)

FOREIGN PATENT DOCUMENTS

| KR | 101131465 | 3/2012 |
|---|---|---|
| WO | 2015036527 | 3/2015 |

*Primary Examiner* — Drew J Brown
(74) *Attorney, Agent, or Firm* — Tarolli, Sundheim, Covell & Tummino LLP

(57) ABSTRACT

A restraint system for helping to protect an occupant of a vehicle having a roof and a cabin with a seat for the occupant includes an airbag having a stored condition within a base of the vehicle seat and being inflatable to deploy upwards in the cabin and between legs of the occupant to a deployed condition in front of the occupant. The airbag including a lower end having a pair of projections spaced apart in a forward-rearward direction of the vehicle. The airbag being configured to utilize the vehicle seat as a reaction surface for restraining the movement of the airbag in response to occupant penetration into the airbag.

23 Claims, 13 Drawing Sheets

(56) References Cited

U.S. PATENT DOCUMENTS

| | | |
|---|---|---|
| 10,023,146 B2 | 7/2018 | Faruque et al. |
| 10,647,286 B1* | 5/2020 | Dennis .................... B60R 21/18 |
| 2019/0126878 A1* | 5/2019 | Fukawatase ........... B60N 2/914 |
| 2020/0298984 A1* | 9/2020 | Walker ................. B60N 2/4221 |
| 2021/0046890 A1* | 2/2021 | Jayakar ............... B60R 21/2338 |

* cited by examiner

SEAT-MOUNTED OCCUPANT RESTRAINT SYSTEM

TECHNICAL FIELD

The present invention relates generally to vehicle airbags and, in particular, relates to seat-mounted airbags that rely on the seat for a reaction surface.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system for helping to protect an occupant of a vehicle having a roof and a cabin with a seat for the occupant includes an airbag having a stored condition within a base of the vehicle seat and being inflatable to deploy upwards in the cabin and between legs of the occupant to a deployed condition in front of the occupant. The airbag including a lower end having first and second projections spaced apart in a forward-rearward direction of the vehicle. The airbag being configured to utilize the vehicle seat as a reaction surface for restraining the movement of the airbag in response to occupant penetration into the airbag.

According to another aspect, a restraint system for helping to protect an occupant of a vehicle having a roof and a cabin with a seat for the occupant includes an airbag having a stored condition within a base of the vehicle seat and being inflatable to deploy upwards in the cabin and between legs of the occupant to a deployed condition in front of the occupant. The airbag includes a lower end with first and second projections spaced apart by an uninflated volume in a forward-rearward direction of the vehicle. The first projection is configured to extend around the occupant's legs and hips into engagement with the seat base. The airbag is configured to utilize the vehicle seat and the occupant as reaction surfaces for restraining the movement of the airbag in response to occupant penetration into the airbag.

Other objects and advantages and a fuller understanding of the invention will be had from the following detailed description and the accompanying drawings.

DETAILED DESCRIPTION

Figure 1:
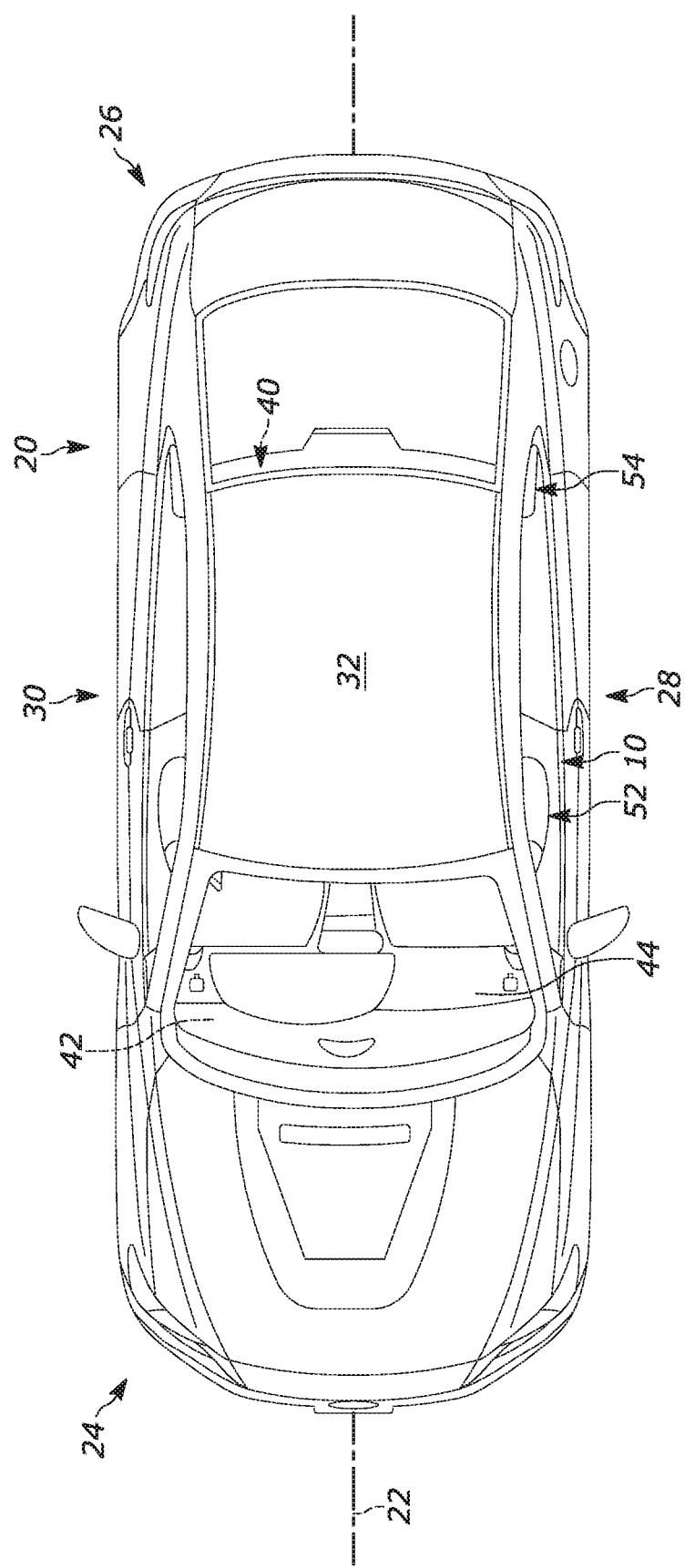
FIG. 1 is a top view of a vehicle including an example seat-mounted, occupant restraint system.
Figure 2:
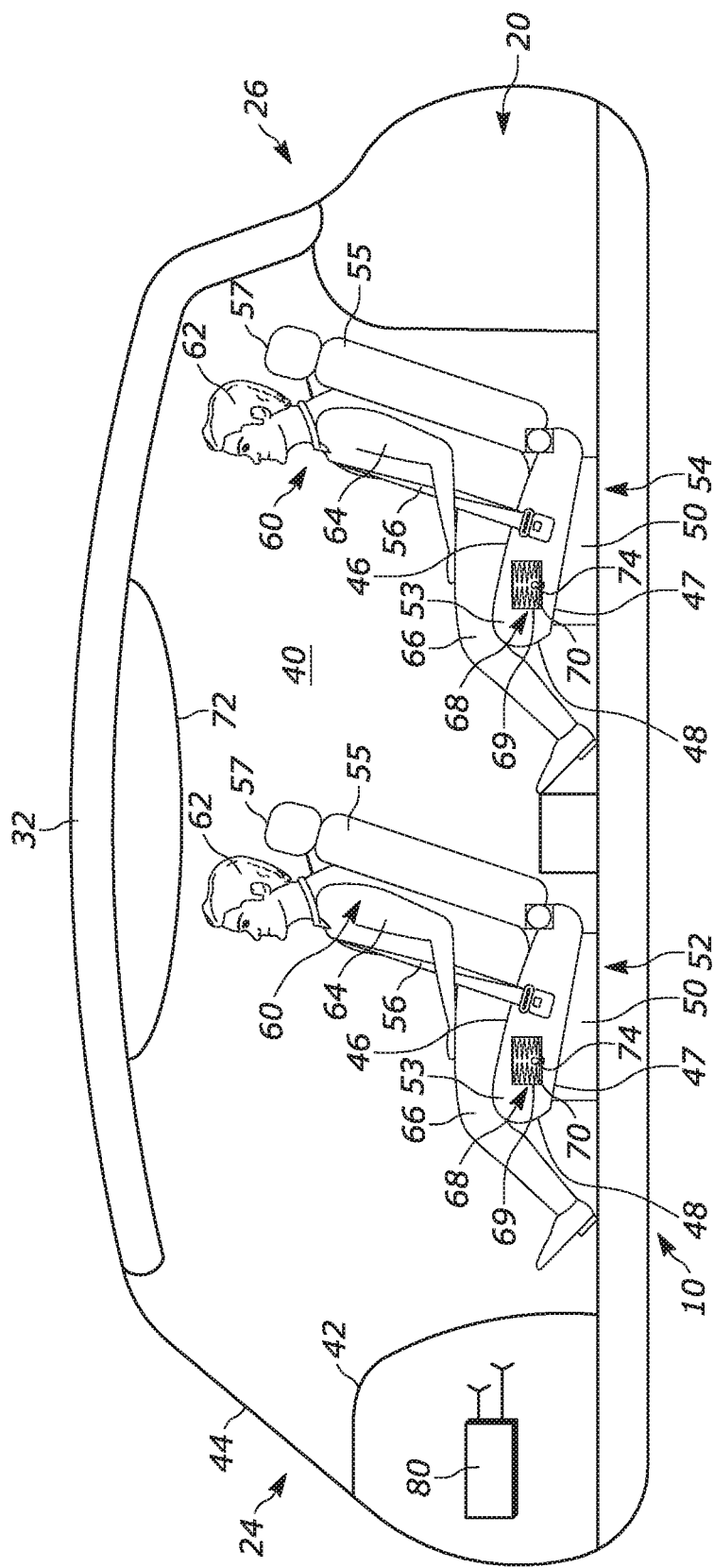
FIG. 2 is a schematic illustration of a cabin of the vehicle with a first seating arrangement and an example airbag of the restraint system in a stored condition.

The present invention relates generally to vehicle airbags and, in particular, relates to seat-mounted airbags that rely on the seat for a reaction surface. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 is located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Figure 3:
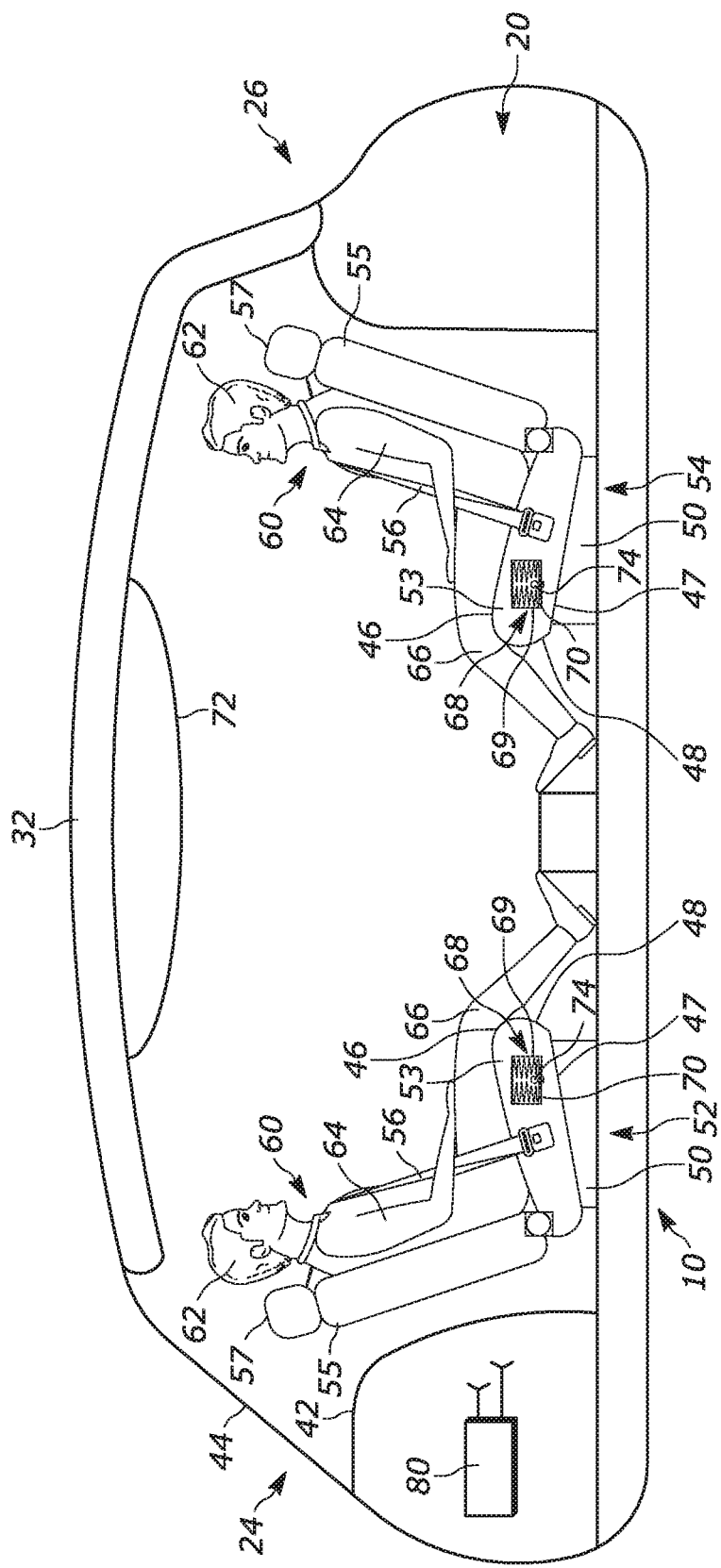
FIG. 3 is a schematic illustration of the cabin with a second seating arrangement and the airbag of the restraint system in a stored condition.

In another seating arrangement shown in FIG. 3, the vehicle 20 includes two rows of seats 50 that face each other, with the front for 52 being rearward-facing and the rear row 54 being forward-facing. For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIG. 2, however, the instrument panel can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

That said, for the unconventional, forward-rearward seating arrangement of FIG. 3, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Figure 4:
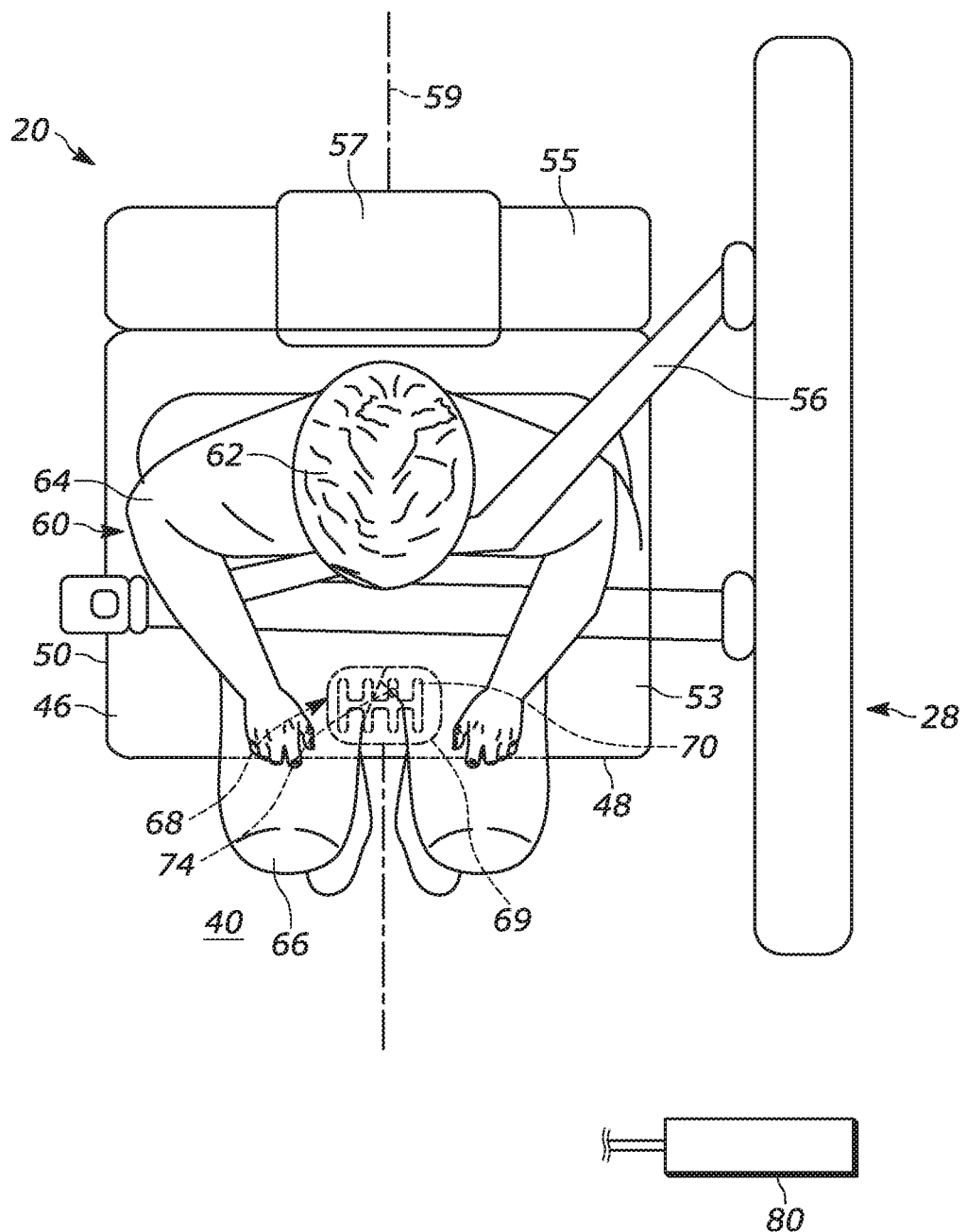
FIG. 4 is a top view of a seat with the airbag in the stored condition.

Regardless of the seating arrangement, each seat 50 extends along a fore-aft centerline 59 (see FIG. 4) and includes a base or bottom 53 for receiving the legs 66 of the occupant 60. The base 53 includes a top side 46, a bottom side 47, and a front or leading side 48. A seat back 55 extends from the base 53 towards the roof 32 and receives the upper torso 64 of the occupant 60. A headrest 57 is connected to the seat back 55 and receives the head 62 of the occupant 60.

In either seating arrangement, since the front row 52 need not face forward and/or need not be in close proximity to the instrument panel 42 or the area where an instrument panel would normally reside, there can be a large volume of space between the front row and the forward cabin structure presented facing the front row. That said, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 includes at least one vehicle occupant protection device in the form of an inflatable airbag 70 housed/concealed in the seats 50 behind, for example, seat upholstery. Mounting the airbags 70 in the seats 50 is convenient because each airbag can be positioned in a location with a desired proximity to the occupant(s) 60 it is intended to help protect. This can help reduce the necessary inflatable volume of the airbags 70 and can also help provide a desired airbag deployment time without requiring an excessively high-volume inflator.

The airbag 70 is stored in a module 68 having a housing 69 made of a durable material such as plastic or metal. In the example configuration of FIG. 2, the airbag modules 68 are mounted in the base 53 of each seat 50. To this end, the airbag modules 68 can be mounted in any of the top side 46, bottom side 47 or front side 48. In each case, the airbag module 68 is positioned along the centerline 59 in the forwardmost portion of the seat base 53 adjacent the lower legs/knees 66 of the occupant 60. By "forwardmost" it is meant the portion of the seat base 53 furthest from the occupants' upper torso 64 in the direction the occupant faces. Of course, each mounting location brings different challenges in terms of configuring the airbag module 68. These challenges and their respective solutions will become apparent in the paragraphs that follow.

Mounting the modules 68 in the forwardmost portion of the seat base 53 allows for rapid deployment into a position extending laterally across the width of the seat 50 and in front of the occupant 60. The airbags 70 can be configured to deploy from their mounting locations upwards towards the roof 32 and both inboard and outboard, namely, to opposite sides of the centerline 59 of the seat 50. More specifically, regardless of where the airbag 70 is mounted in the base 53, the airbag inflates and deploys upwards in the cabin 40, between the legs 66 of the occupant 60, then inboard and outboard from between the legs.

The airbag 70 is at least one of rolled and folded before being placed in the housing 69 of the module 68. The module 68 is then placed within the base 53 of the seat 50 and covered with the seat upholstery and/or a door. Alternatively, the housing 69 can be secured to the exterior of the base 53 (e.g., along the bottom side 47) via brackets (not shown). Regardless, the occupant restraint system 10 also includes an inflator 74 positioned in each module 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided in each seat 50 in each row 52, 54. In other words, each seat 50 in the vehicle 20 can have an individual module 68 (with corresponding airbag 70 and inflator 74) associated therewith (see also FIG. 4). Each airbag 70 is positioned in the base 53 of the seat 50 in front of the seatbelt 56 associated with that seat (i.e., forward of the seatbelts 56 in the front row 52 and forward of the seatbelts in the rear row 54 in FIG. 2; rearward of the seatbelts in the front row and forward of the seatbelts in the rear row in FIG. 3). Although the airbags within each seat 50 are identical for each row provided in the vehicle 20, the construction and operation of only the airbag associated with a seat 50 in the rear row 54 is discussed for brevity.

As shown in FIG. 2, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and the seat upholstery to open (e.g., via tear seam or door). This releases the airbag 70 to inflate and deploy from its stored condition behind the seat upholstery to a deployed condition extending into the cabin 40 forward of and aligned with the seat 50 in the rear row 54. The airbag 70, while inflated, helps protect the vehicle occupant 60 in the rear row 54 by absorbing the impact of the occupant.

Figure 5:
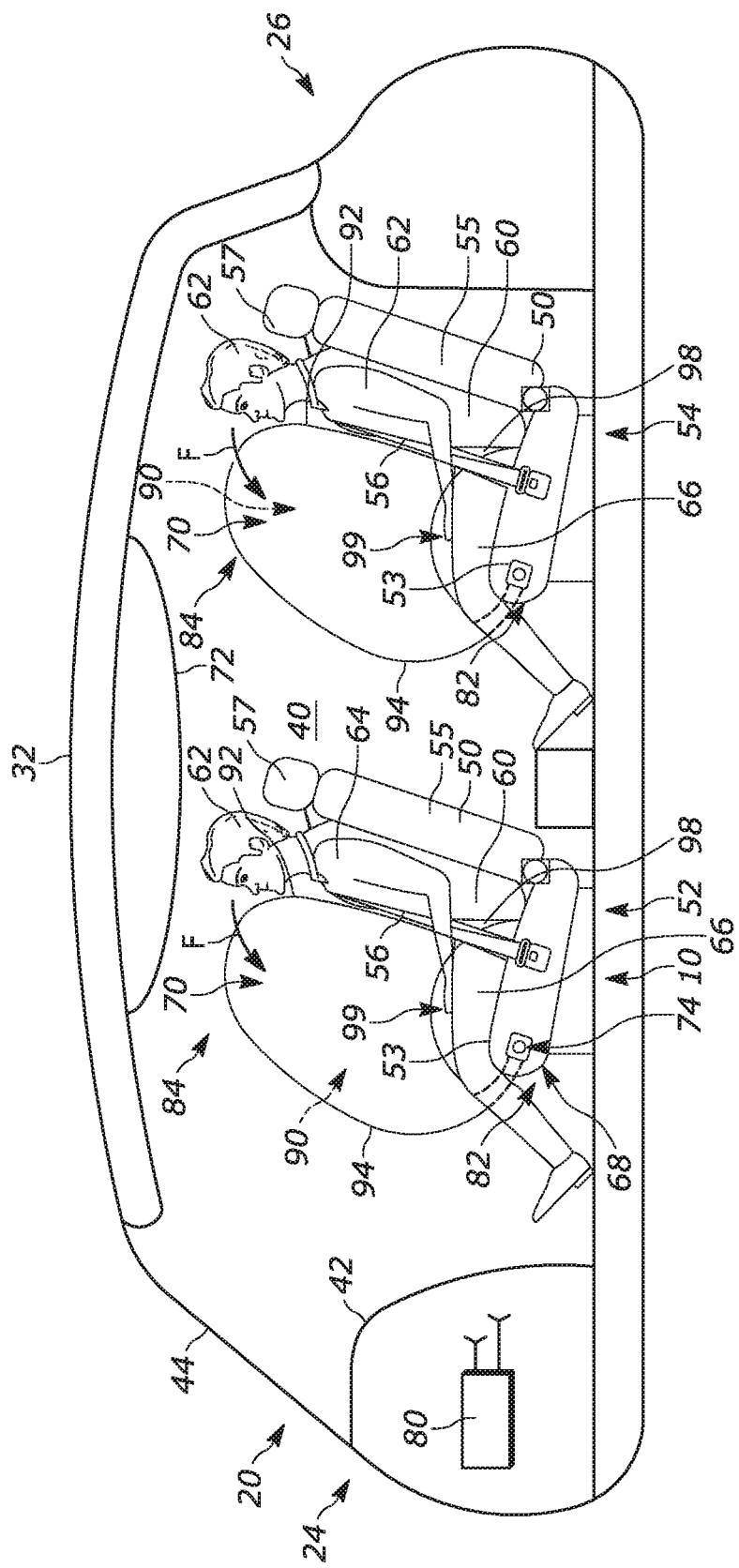
FIG. 5 is a schematic illustration of the cabin with the airbag in a deployed condition.
Figure 6:
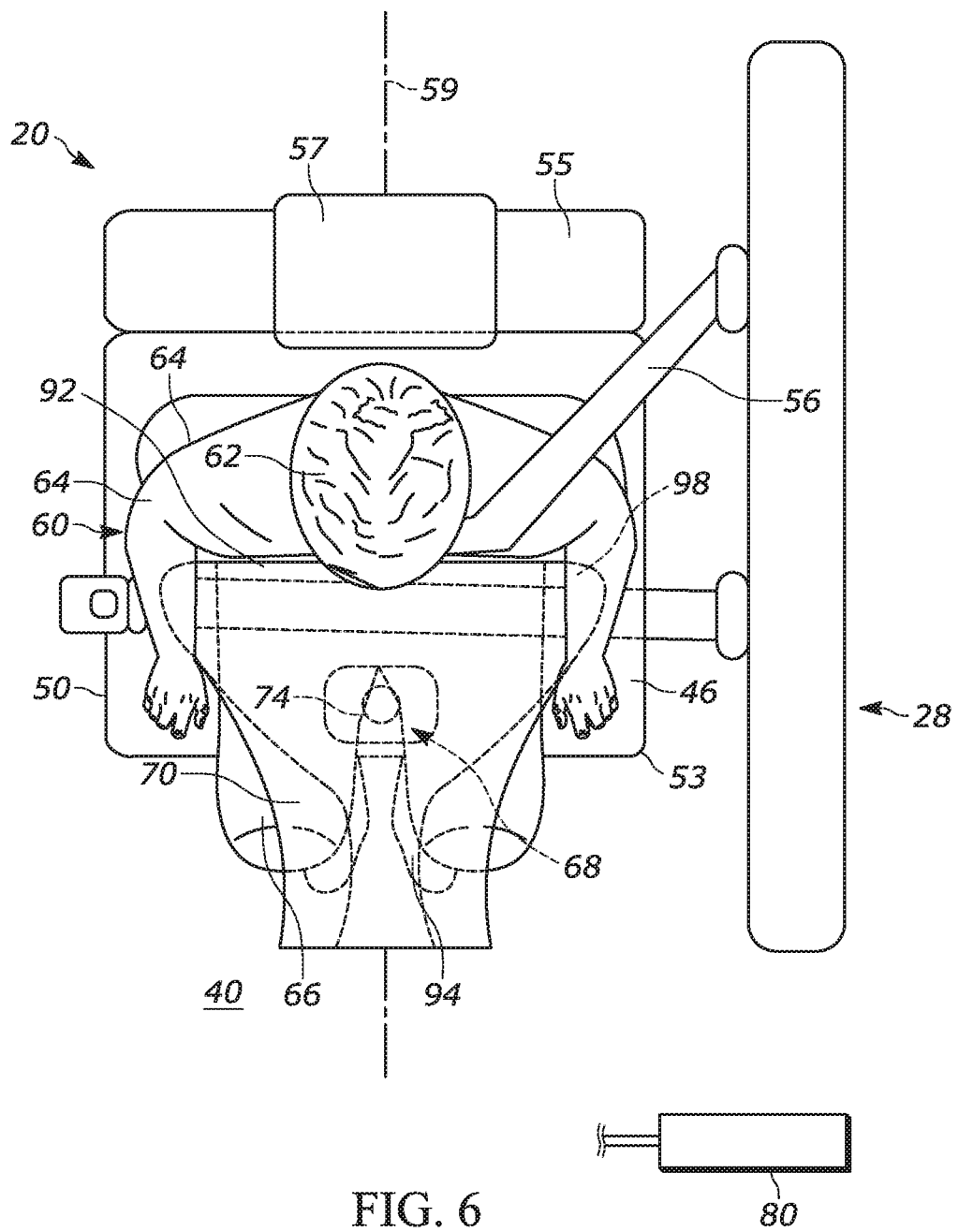
FIG. 6 is a top view of the occupant in the seat of FIG. 4 with the airbag in the deployed condition.

As shown in FIGS. 5-6, the airbag 70 inflates from its stored locations in the base 53 to its deployed condition. The airbag 70, when deployed, extends from a lower end 82 to an upper end 84 and defines an inflatable volume 90. The lower end 82 is connected to the seat 50 and fluidly connected to the inflator 74. The trajectory of the airbag 70 deployment can be controlled by a deflecting member (not shown) provided on the base 53 adjacent the module 68. The door of the housing 69, for example, can pivot away from the housing 69 to not only allow the airbag 70 to deploy but can remain connected to the housing so as to deflect or guide deployment in a prescribed manner. A separate door or ramp connected to the housing 69 or base 53 can also be used to control the airbag 70 deployment trajectory.

Figure 7A:
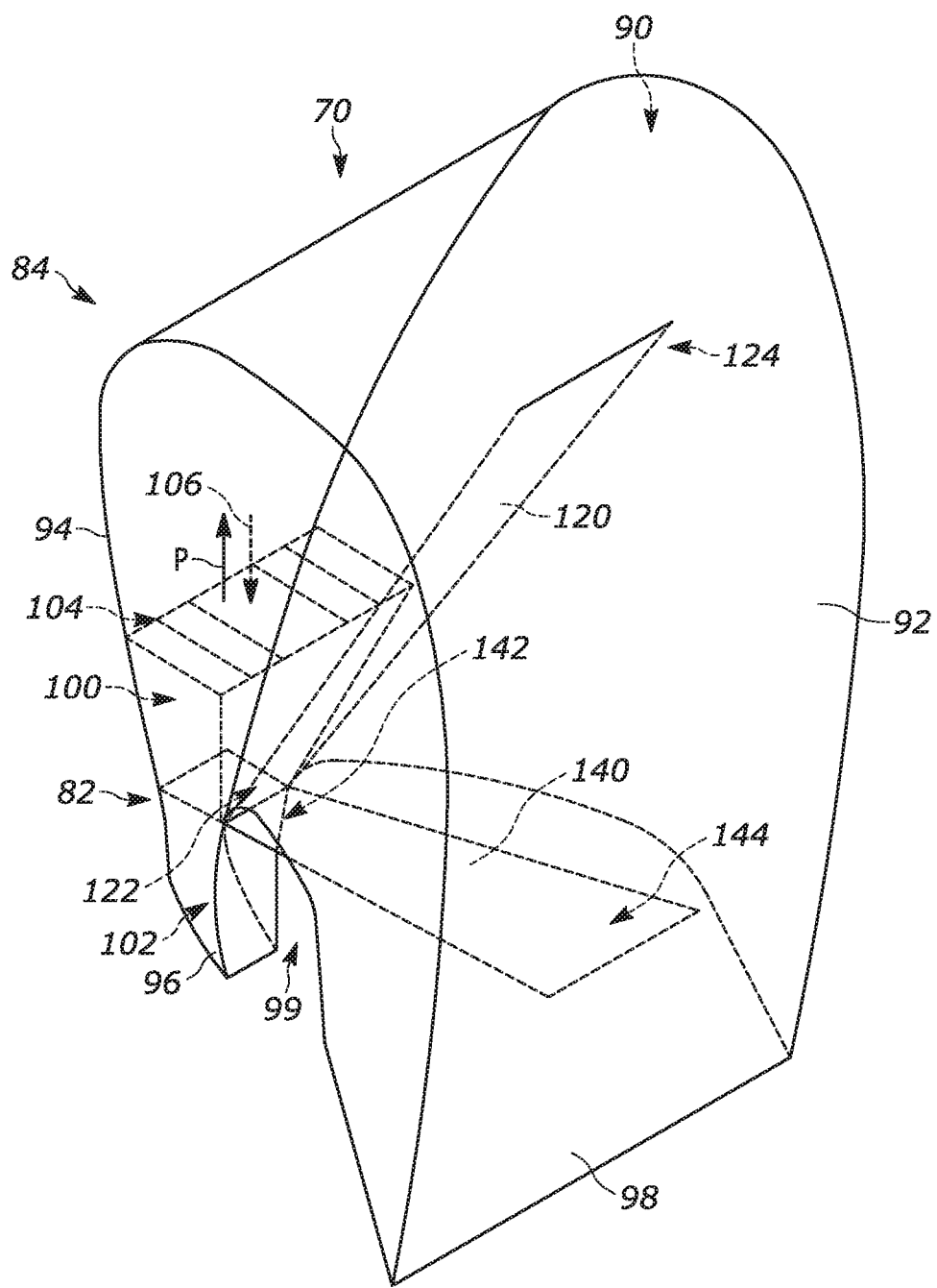
FIG. 7A is a schematic illustration of the airbag.
Figure 7B:
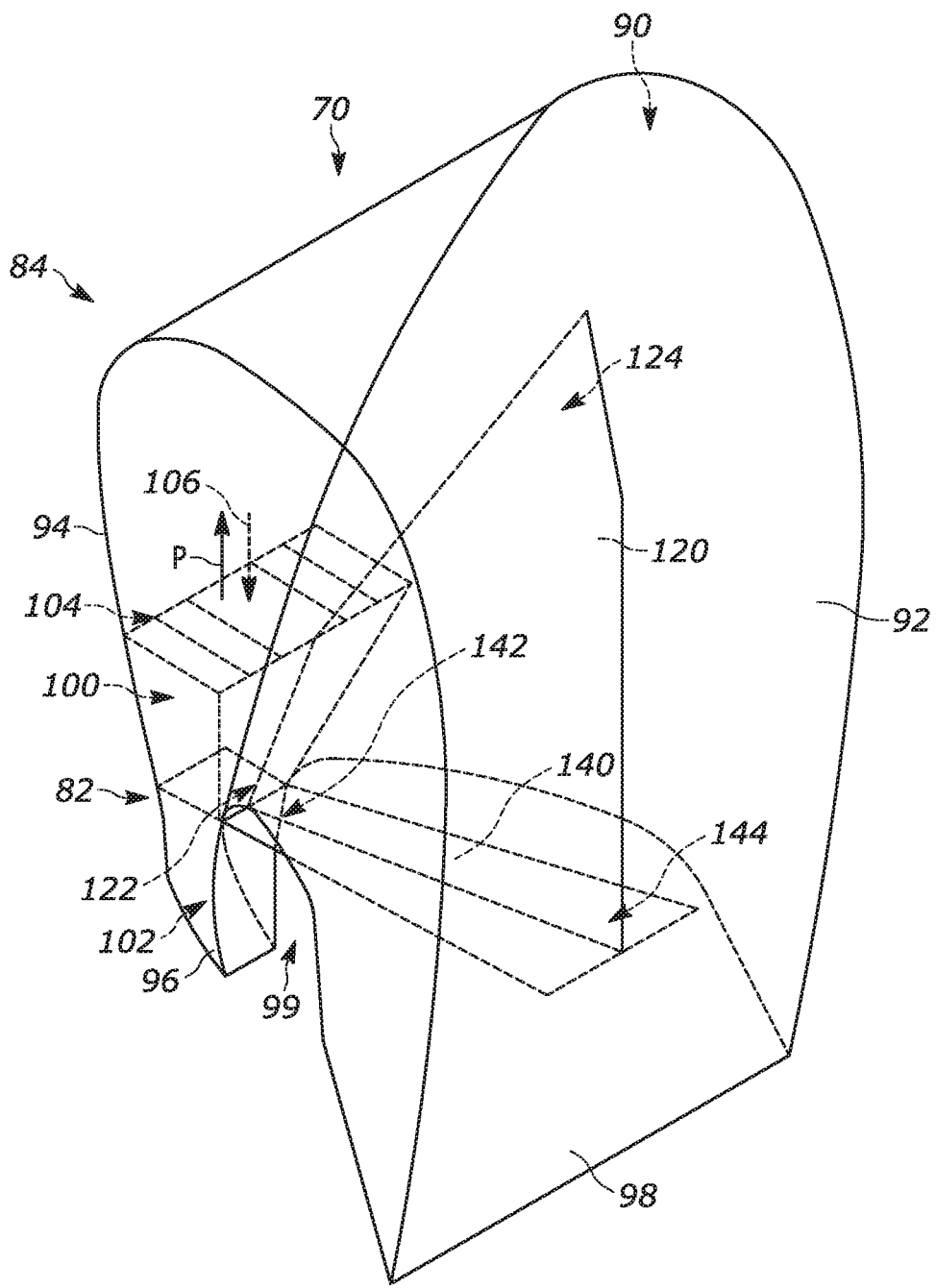
FIG. 7B is a schematic illustration of another example airbag.
Figure 8:
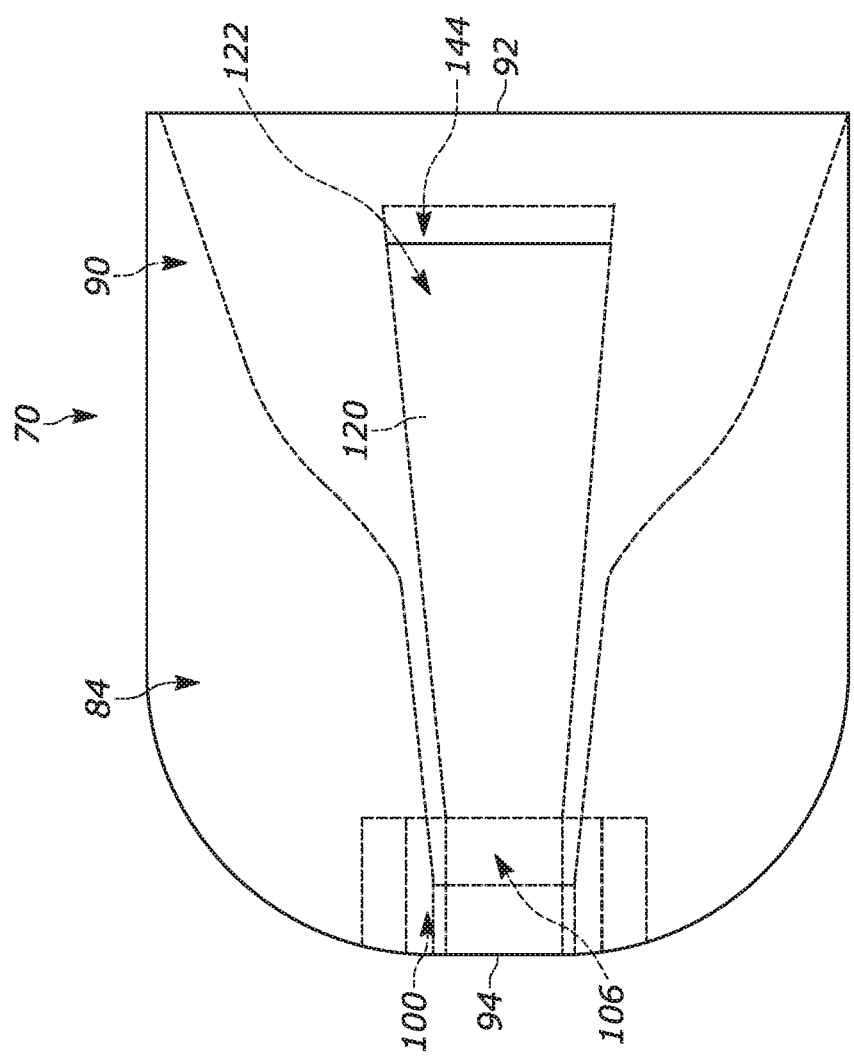
FIG. 8 is a top view of the airbag of FIG. 7A.

Referring further to FIGS. 7-8, the lower end 82 includes a pair of projections 96, 98 spaced apart in the forward-rearward direction by a cavity or uninflated space 99. Consequently, the lower end 82 can have an inverted U-shaped configuration. The projection 96 can engage the top side 46 and front side 48 of the base 53. The projection 98 engages the top side 46 of the base 53 adjacent the seat back 55.

The upper end 84 is positioned adjacent an occupant 60 in the rear row 54. A first or rear side 92 faces towards the occupant 60 in the associated seat 50. A second or front side 94 faces away from the occupant 60. The airbag 70 tapers inwards or narrows towards the centerline 59 of the base 53 in a direction extending from the rear side 92 to the front side 94.

In its deployed condition, the airbag 70 is configured to extend across the width of the seat 50 in front of the occupant 60 and upward from the seat to a position sufficient to receive and help protect the occupant's head 62 and upper torso 64. The lower end 82 is configured to cover at least a portion of the occupant's knees and the upper portion of the legs 66. To this end, the cavity 99 allows the lower end 82 to deploy from the seat base 53, over/around the occupant's lap, and to either side of the occupant's hips adjacent the seat back 55.

The lower end 82 and, more specifically, the projection 98 is configured to contour around the legs 66 of the occupant 60 and engage the top side 46 of the base 53 on opposite sides of the occupant (see FIGS. 5-6). To this end, the inflation fluid pressure within the projection 98 can be tailored that the deploying airbag 70 deploys into the legs 66 and then deforms around the legs and hips of the occupant into engagement with the top side 46 on either side of the occupant 60. Alternatively, the projection 98 can include pockets or recesses (not shown) that receive the legs 66 and allow the projection to engage the top side 46.

The extent of the airbag 70 deployment vertically and/or horizontally (as shown in FIGS. 5-6) can be adjusted in order to adjust the coverage of the airbags. To this end, the airbag 70 can be configured to extend further inboard and/or outboard in order to help protect the occupant 60 in the event of an oblique or offset collision. The inflated depth of the airbag 70 (in the direction of the centerline 22) can also be adjusted.

Because the occupant 60 is belted, a frontal crash resulting in forward occupant 60 movement causes the occupant to bend at the waist and follow an angled or arcuate path toward the airbag 70, as indicated generally by the arrow F in FIG. 5. As noted, there is no vehicle structure in position to act as a reaction surface to constrain movement of the deployed airbag 70.

Advantageously, as shown in FIGS. 5-6, the engagement between the projection 96 lower end 82 of the airbag 70 and the base 53 of the seat 50 produces reaction forces extending in directions opposite the impact forces applied to the airbag by the penetrating occupant 60. As a result, the seat 50 (particularly the base 53), acts as the reaction surface for the airbag 70. The airbag 70 therefore provides a ride-down effect on the moving occupant 60 to thereby help reduce loads thereon. To this end, the airbag 70 accommodates the moving occupant 60 by providing a more gradual reaction force in response to occupant penetration.

Additionally, because the projection 98 extends around the occupant's legs 66 and hips and engages the top side 46 of the base 53, the projection enables the airbag 70 to help protect the occupant 60 in the event of an oblique vehicle crash. More specifically, base 53 provides reaction surfaces to the projection 98 on opposite sides of the occupant 60. As a result, an occupant 60 moving away from the seat back 55 in a direction inboard or outboard relative to the vehicle centerline 22 and penetrating the airbag 70 will experience the opposing reaction forces from the top side 46 against the projection 98. Those opposing reaction forces help to limit movement of the airbag 70 away from the penetrating occupant 60 and help to limit the impact forces between the occupant and airbag.

Moreover, it will be appreciated that interaction between the occupant 60 and the lower end 82 of the airbag 70 can also provide a reaction surface for the airbag. In particular, movement of the occupant 60 along the path F can cause the lower end 82 of the airbag 70 to engage the occupant's knees and the upper portion of the legs 66. As a result, the legs 66 of the occupant 60 provides a reaction force that is opposite the impact forces applied to the airbag 70 by the penetrating occupant. Consequently, the occupants 60 themselves can help provide a ride-down effect as they penetrate the airbag 70. The airbag 70 in FIGS. 1-6 therefore requires no interaction with forward structure of the vehicle 20, such as an instrument panel, steering wheel, or seat, to provide a reaction surface for the airbag 70.

That said, the connection between the lower end 82 and the seat base 53, in combination with the airbag 70 deployment over/adjacent the occupant's lap, act to limit or restrict movement of the airbag away from the occupant 60 in response to occupant penetration. In other words, the seat 50 and occupant 60 cooperate to help prevent or limit airbag 70 movement in the direction F.

The inflation rate, deployment trajectory, and shape of the airbag 70 can be configured to optimize the protection of occupants 60 having a wide range of sizes and/or seating positions. To this end, the airbag 70 can optionally be used in combination with tethers, have multiple chambers, and/or include a calzone 100 to achieve appropriate or desired deployment characteristics suitable for the vehicle interior and/or seating position of the occupants 60. These features can be configured to help protect occupants 60 that are slouched, reclined, etc.

Referring to FIG. 8, the lower end 82 of the airbag 70 connected to the inflator 74 and the seat base 53 can have a reduced cross-sectional area relative to the remainder of the airbag 70. It may therefore be desirable to direct the incoming heated inflation fluid in a prescribed manner into the inflatable volume 90 to help avoid direct contact between the inflation fluid and the lower end 82. Consequently, a calzone 100 can be secured to the interior of the lower end 82, i.e., within the projection 96.

The calzone 100 is tubular and extends from a first end 102 adjacent the inflator 74 to a second end 104 positioned closer to the upper end 84. A passage 106 extends the entire length of the calzone 100 between the ends 102, 104. The passage 106 defines a flow path P for the inflation fluid from the inflator 74 to the inflatable volume 90.

Figure 9A:
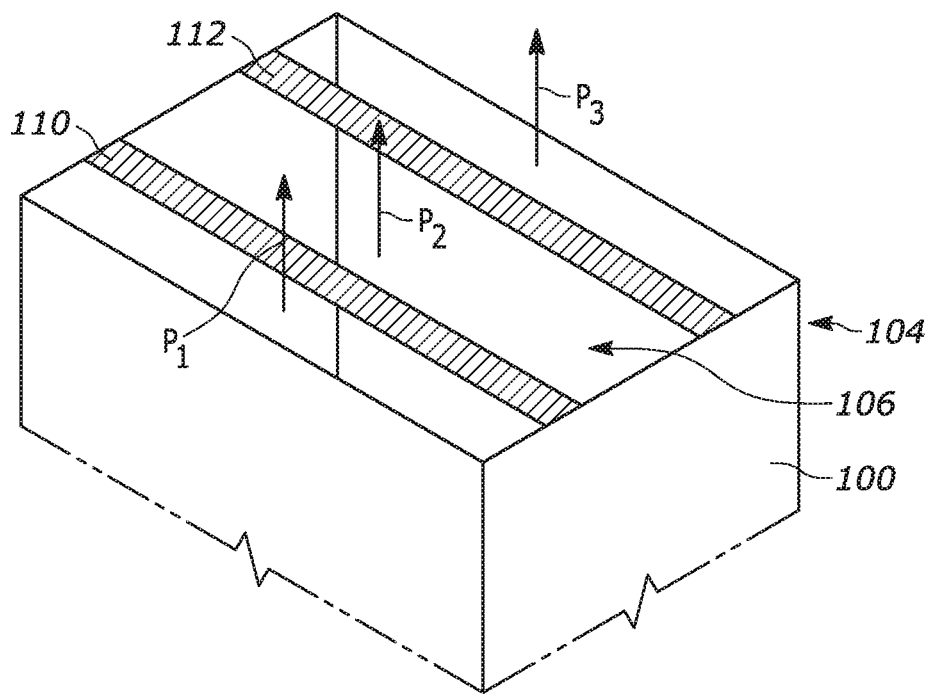
FIG. 9A is a schematic illustration of a calzone for the airbag of FIG. 7A.
Figure 9B:
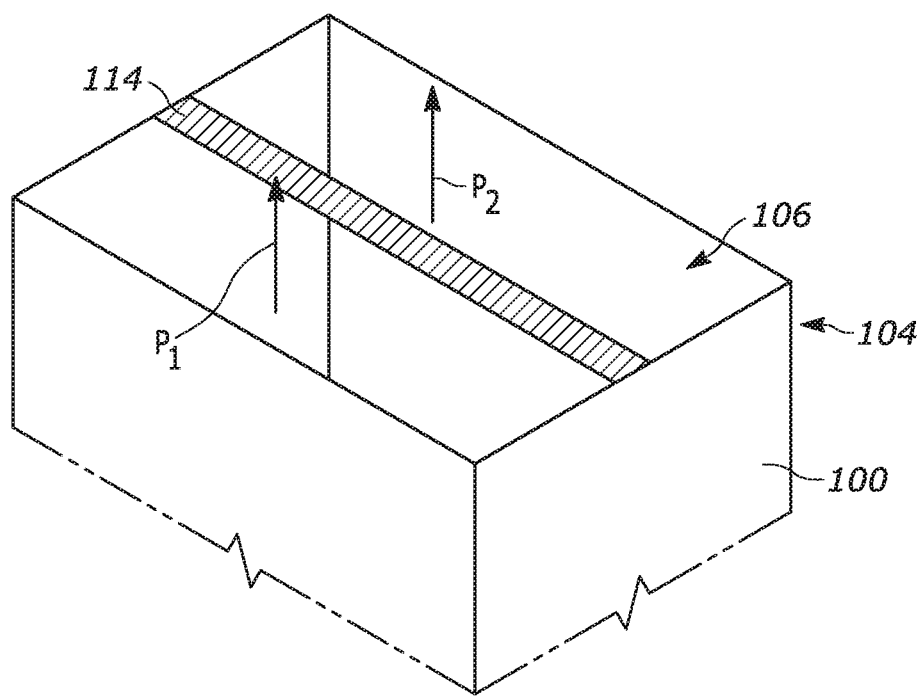
FIG. 9B is a schematic illustration of another example calzone for the airbag of FIG. 7A.

One or more partitions can be connected to or formed in the second end 104 of the calzone 100 for separating the flow path into multiple, different portions. In the example shown in FIG. 9A, a pair of partitions 110, 112 separates the flow path into three distinct portions $P_1$, $P_2$, $P_3$. In another example shown in FIG. 9B, a single partition 114 separates the flow path into two distinct portions $P_1$, $P_2$. In each case, the incoming, heated inflation fluid is directed from the inflator 74 and into the inflatable volume 90 in a prescribed manner without directly contacting the lower end 82 of the airbag 70.

Referring back to FIGS. 7A-7B, a tether 120 can be provided inside the airbag 70 for helping to control deployment thereof. The tether 120 is formed from an inextensible material and extends from a first end 122 to a second end 124. The first end 122 can be connected to the calzone 100 (as shown) or to the front side 94 of the airbag 70 (not shown). The second end 124 is connected to the rear side 92 of the airbag 70. The tether 120 is angled downwards in a direction extending away from the occupant 60. The tether 120 can extend generally in a horizontal plane (FIG. 7A) or a vertical plane (FIG. 7B).

Alternatively or additionally, an external tether 140 can be provided outside the inflatable volume 90 of the airbag 70 for helping to control deployment thereof. The tether 140 is formed from an inextensible material and extends from a first end 142 to a second end 144. The first end 142 can be connected to the exterior of the projection 96 at the lower end 82. The second end 144 can be connected to the exterior of the projection 98. The tether 140 can extend through the cavity 99 between the occupant's legs 66. The second end 144 could also extend around the projection 98 and be secured to the rear side 92 of the airbag 70 (not shown).

The tether 120 and/or tether 140, when provided on the airbag 70, help to limit deployment of the airbag towards the occupant 60 and thereby help to reduce reaction forces between the deploying airbag and the occupant. In particular, the internal tether 120 can be positioned within and connected to the interior of the airbag 70 to help reduce impact forces between the deploying airbag and the occupant's head 62 and neck. The external tether 140 can be positioned on and connected to the exterior of the airbag 70 to help reduce impact forces between the deploying airbag and the occupant's upper torso 64. Either or both of the tethers 120, 140 can include rupturable tear stitching to help control deployment of the airbag 70 and interaction of the airbag with the penetrating occupant 60.

The airbag 70a can include one or more additional chambers for helping to further protect the occupant 60. This can include, for instance, additional chambers on the lower end 82, upper end 84, inboard side, outboard side, rear end 92 and/or front side 94 tailored, sized, and configured to help protect particular portions of the occupant 60 (e.g., head, upper torso, lower torso, legs, etc.) in response to different vehicle crash scenarios (e.g., frontal, angular, oblique, offset, rear, etc.).

Figure 10A:
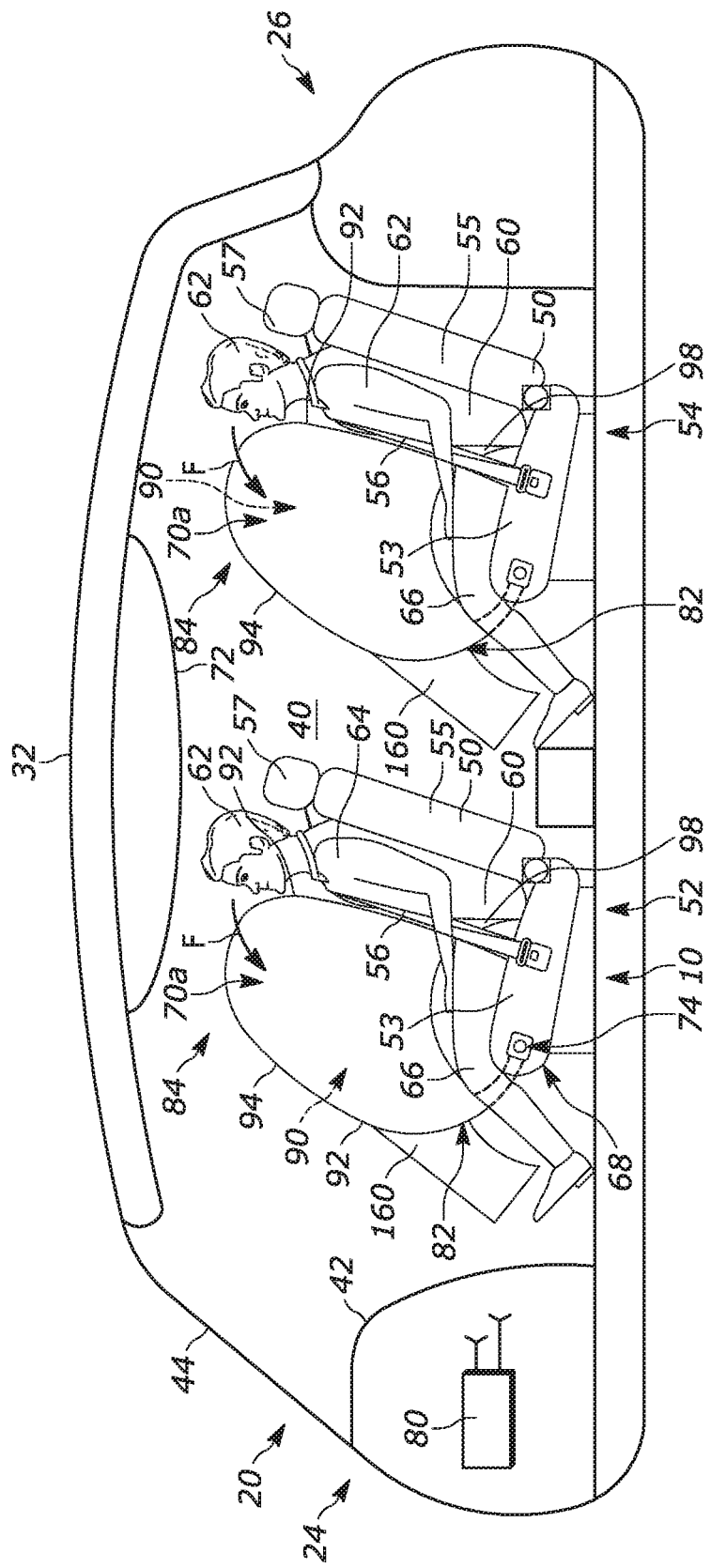
FIG. 10A is a schematic illustration of the cabin with another example airbag in a deployed condition.
Figure 10B:
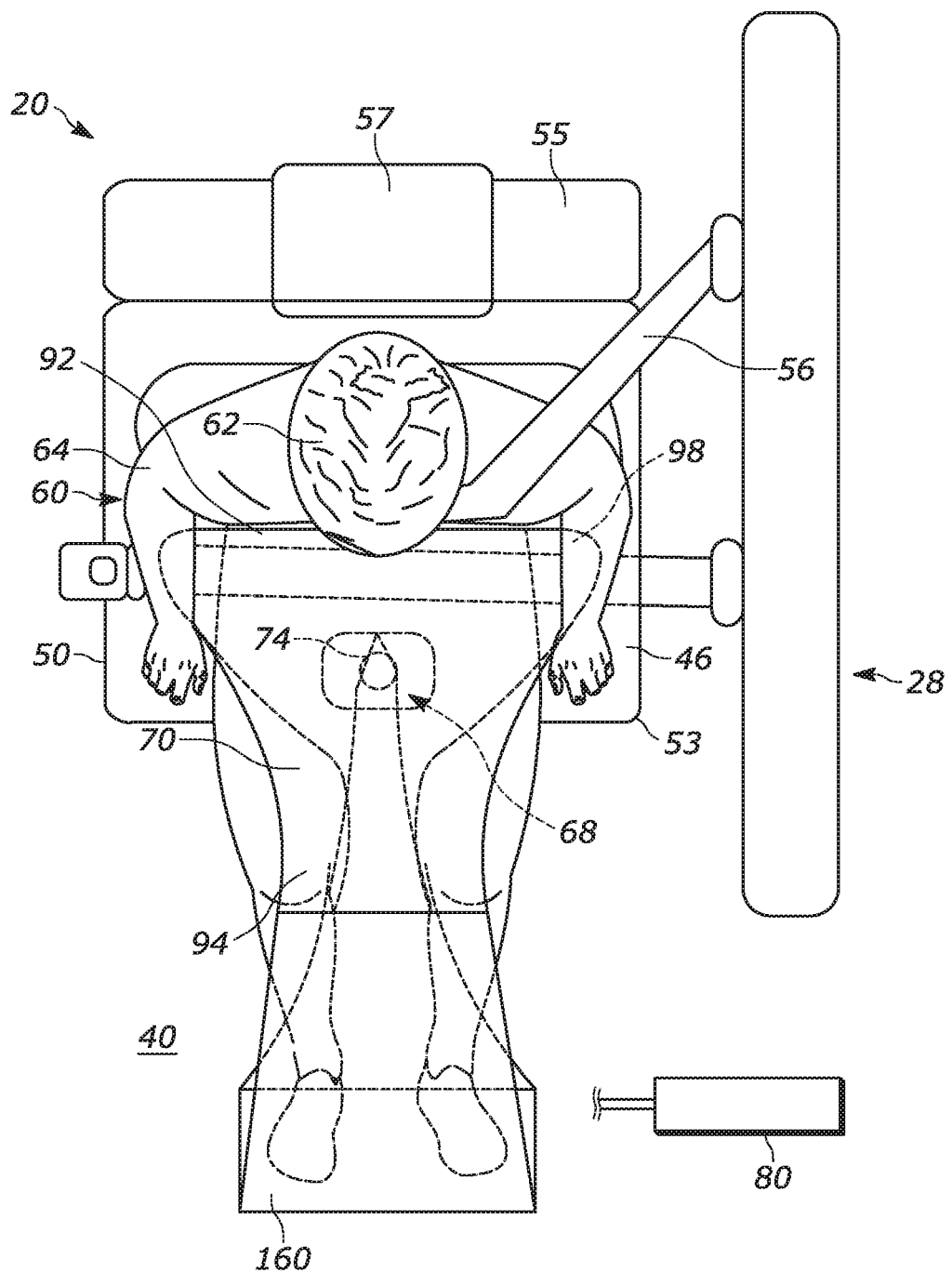
FIG. 10B is a top view of the occupant in the seat of FIG. 10A with the airbag in the deployed condition.

In an example shown in FIGS. 10A-10B, an optional chamber 160 can provided at the lower end 82 and extends from the rear side 92 away from the seat 50 for helping to protect the occupant's legs 66. To this end, the chamber 160 can extend in the inboard-outboard direction sufficient to cover or exceed the width of the legs 66 and can be contoured (e.g., curved) to more appropriately interact with the legs during movement thereof. The chamber 160 is inflatable and fluidly connected to the inflatable volume 90 such that inflation fluid can flow from the inflator 74 to the chamber 160.

Figure 11A:
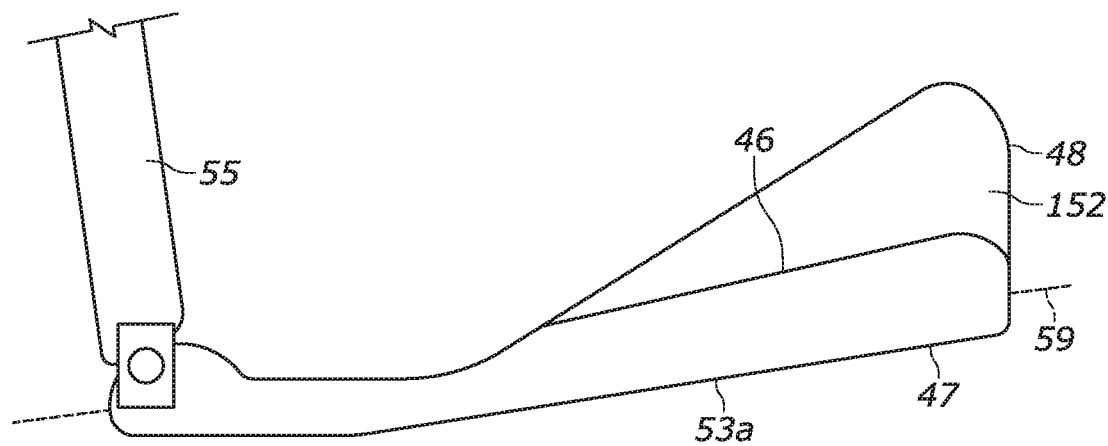
FIG. 11A is a side view of an example seat base.
Figure 11B:
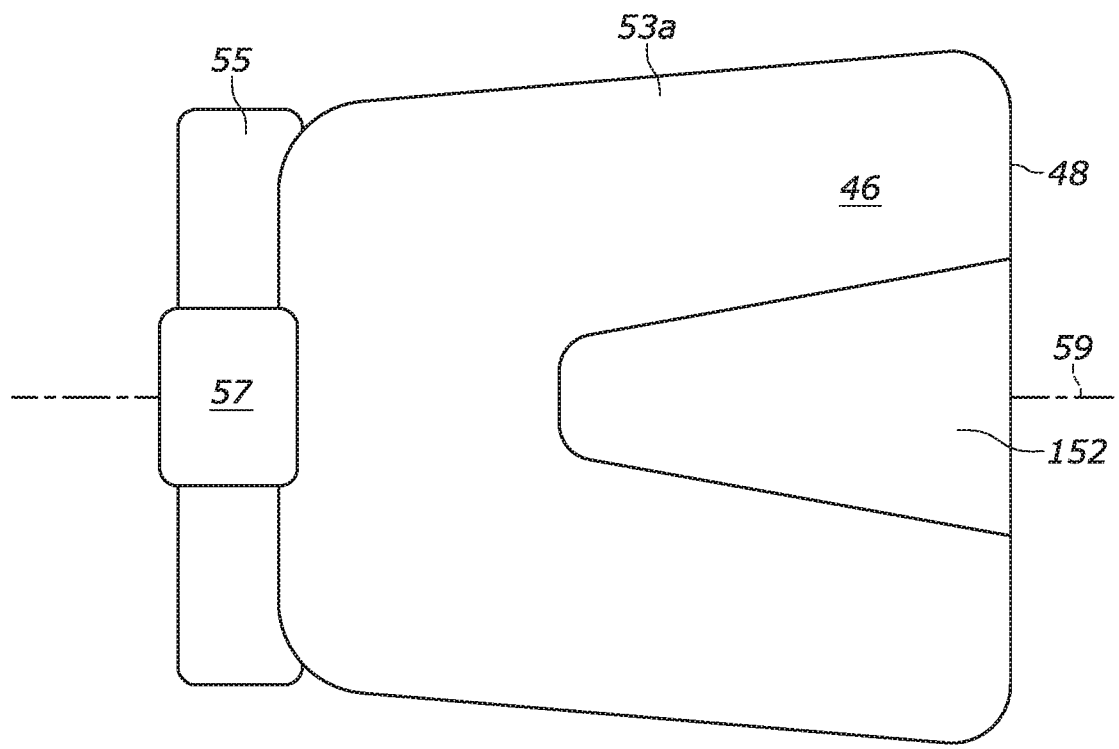
FIG. 11B is a top view of the seat base of FIG. 11A.

Since the airbag module 68 is provided on or in the base 53 and the airbag deploys therefrom, it may be desirable to configure the seat base to accommodate the module and/or facilitate airbag deployment. Referring to FIGS. 11A-11B, the front side 48, top side 46 and/or bottom side 47 of the base 53 can be enlarged compared to existing seat bases. To this end, the base 53 can include a ramp or enlarged portion 152 that tapers upwards away from the top side 46 in a direction extending away from the seat back 55. As a result, the moving/penetrating occupant 60 encounters an increased resistance to movement away from the seat back 55. In other words, the ramp 152 acts to hinder or slow down movement of the occupant 60 along and relative to the base 53 away from the seat back 55, thereby helping to reduce impact forces between the occupant and the deployed airbag 70.

The ramp 152 can also be configured to urge/keep the occupant's legs 66 spaced apart to maximize the open or unobstructed space through which the airbag 70 can inflate and deploy between the legs. As shown, the ramp 152 widens or tapers outwardly away from the centerline 59 in a direction extending away from the seat back 55. In one instance, the ramp 152 is symmetrical about the centerline 59 when viewed from above. The ramp 152 can be configured to maintain at least, for example, about a 150-200 mm gap between the occupant's legs 66.

Since the airbags shown and described herein are mounted along/adjacent to the centerline of the seat and deploy between the legs of the occupant, the airbags can help protect the occupants in the event of an oblique impact. In the event of an oblique impact, the occupant 60 moves forward in the vehicle 20 in a direction that is angled either inboard of the vehicle (i.e., toward the vehicle centerline 22 or right side 30) or outboard of the vehicle (i.e., toward the left side 28). Of course, the oblique direction in which the occupant 60 moves, and their resulting position, can vary depending on the particulars of the impact event, such as the angle and/or velocity at which the vehicle 20 impacts another vehicle or object.

From the above, it will be appreciated that the example configurations of FIGS. 1-11B illustrate that the airbag 70 is configured to utilize the vehicle seat 50 and occupant lap/legs 66 as a reaction surface regardless of whether the seats are in the conventional seating arrangement (FIG. 2) or the unconventional seating arrangement (FIG. 3). By "reaction surface," it is meant that it is the vehicle seats 50 and occupant's lap/legs 66 that support their respective airbags 70 against movement in response to the impacting occupants 60. This allows the airbags 70 to absorb impact forces of the occupants 60 and provide the desired ride-down effect.

Advantageously, the example configurations can rely only the vehicle seat 50 and occupant's lap/legs 66 to provide the reaction surface and can provide effective occupant protection without requiring any support from structure other than the seats. The vehicle seats 50 can thereby support the airbag modules 68 and the airbags 70 entirely.

Although the restraint system is shown and described using an inflatable, seat-mounted airbag, it will be appreciated that one or more additional active or passive vehicle safety systems or airbags can be used (e.g., knee airbag, under-thigh airbag, side curtain airbag, roof-mounted airbag, motorized seat belt, anchor pretensioner, seat belt buckle pretensioner and/or belt retractor pretensioner) in accordance with the present invention.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. To this end, it will also be appreciated that features shown and illustrated in any one example can likewise be added to/interchanged with features in any other example.

I claim:

1. A restraint system for helping to protect an occupant of a vehicle having a roof and a cabin with a seat for the occupant, comprising:
an airbag having a stored condition within a base of the vehicle seat and being inflatable to deploy upwards in the cabin and between legs of the occupant to a deployed condition in front of the occupant, the airbag including a lower end having first and second projections spaced apart in a forward-rearward direction of the vehicle, the airbag being configured to utilize the vehicle seat as a reaction surface for restraining the movement of the airbag in response to occupant penetration into the airbag.

2. The restraint system recited in claim 1, wherein the first and second projections are spaced apart by an uninflated volume.

3. The restraint system recited in claim 2, wherein the uninflated volume is configured to receive an upper portion of the legs of the occupant.

4. The restraint system recited in claim 2 further comprising an external tether extending through the uninflated volume and having a first end connected to the first projection and a second end connected to the second projection.

5. The restraint system recited in claim 1, wherein the lower end has a substantially inverted U-shaped configuration.

6. The restraint system recited in claim 1, wherein the airbag is positioned in a module located along a forward-rearward centerline of the seat base.

7. The restraint system recited in claim 1, further comprising at least one tether extending in a forward-rearward direction of the vehicle and having first and second ends connected to the airbag for limiting movement of the deploying airbag towards the occupant.

8. The restraint system recited in claim 7, wherein the at least one tether comprises an interior tether with the first and second ends being connected to interior surfaces of the airbag.

9. The restraint system recited in claim 7, wherein the at least one tether includes rupturable tear stitching for controlling deployment of the airbag.

10. The restraint system recited in claim 1, wherein the first projection is configured to the shape of the occupant's legs in response to deployment into the occupant.

11. The restraint system recited in claim 1, wherein the first projection is configured to extend around the occupant's legs and hips into engagement with the seat base.

12. The restraint system recited in claim 1, wherein the seat base includes a tapered portion configured to keep the occupant's legs apart a predetermined distance during deployment of the airbag.

13. The restraint system recited in claim 1, wherein the airbag is configured to use the occupant's legs as a reaction surface.

14. The restraint system recited in claim 1 further comprising at least one of a knee airbag, under-thigh airbag, side curtain airbag, roof-mounted airbag, motorized seat belt, anchor pretensioner, seat belt buckle pretensioner and belt retractor pretensioner.

15. The restraint system recited in claim 1 further comprising an inflatable chamber extending from the lower end and away from the seat 50 for helping to protect the occupant's legs.

16. An airbag module comprising the restraint system of claim 1 and further comprising a housing configured to be mounted in the vehicle seat and an inflator for providing inflation fluid for inflating the airbag.

17. The restraint system recited in claim 1, further comprising:
- a sensor for sensing the occurrence of an event for which deployment of the airbag is desired and producing a signal indicative thereof; and
- a controller connected to the sensor and, in response to receiving the signal, actuating an inflator to inflate the airbag to the deployed condition.

18. A restraint system for helping to protect an occupant of a vehicle having a roof and a cabin with a seat for the occupant, comprising:
- an airbag having a stored condition within a base of the vehicle seat and being inflatable to deploy upwards in the cabin and between legs of the occupant to a deployed condition in front of the occupant, the airbag including a lower end having first and second projections spaced apart by an uninflated volume in a forward-rearward direction of the vehicle, the first projection being configured to extend around the occupant's legs and hips into engagement with the seat base, the airbag being configured to utilize the vehicle seat and the occupant as reaction surfaces for restraining the movement of the airbag in response to occupant penetration into the airbag.

19. The restraint system recited in claim 18, wherein the uninflated volume is configured to receive an upper portion of the legs of the occupant.

20. The restraint system recited in claim 18 further comprising an external tether extending through the uninflated volume and having a first end connected to the first projection and a second end connected to the second projection.

21. The restraint system recited in claim 18, further comprising an interior tether with first and second ends connected to interior surfaces of the airbag and extending downward in a direction extending away from the occupant.

22. The restraint system recited in claim 18, wherein the first projection is configured to the shape of the occupant's legs in response to deployment into the occupant.

23. The restraint system recited in claim 18, wherein the airbag is configured to use the occupant's legs as a reaction surface.

* * * * *